United States Patent
Ho et al.

(10) Patent No.: US 7,848,702 B2
(45) Date of Patent: Dec. 7, 2010

(54) EMERGENCY LIGHTING SYSTEM

(75) Inventors: Dang Hai Ho, Canterbury (AU); Drago Lavrencic, Ryde (AU); Michael Douglas Finch, Hurlstone Park (AU); Zoltan Kocsi, Baulkham Hills (AU)

(73) Assignee: Thomas & Betts International, Inc., Wilmington, DE (US)

( * ) Notice: Subject to any disclaimer, the term of this patent is extended or adjusted under 35 U.S.C. 154(b) by 653 days.

(21) Appl. No.: 11/880,968

(22) Filed: Jul. 25, 2007

(65) Prior Publication Data
US 2008/0026781 A1 Jan. 31, 2008

(30) Foreign Application Priority Data
Jul. 26, 2006 (AU) .............................. 2006904063

(51) Int. Cl.
H04B 7/15 (2006.01)
(52) U.S. Cl. .................................. 455/11.1; 455/404.1
(58) Field of Classification Search ............. 455/404.1, 455/7, 11.1, 13.1, 15
See application file for complete search history.

(56) References Cited

U.S. PATENT DOCUMENTS

| | | | |
|---|---|---|---|
| 4,977,353 A | 12/1990 | Helal et al. | |
| 5,154,504 A | 10/1992 | Helal et al. | |
| 5,160,924 A | 11/1992 | Conil et al. | |
| 5,673,252 A | 9/1997 | Johnson et al. | |
| 5,778,325 A | 7/1998 | Lindell et al. | |
| 7,265,684 B2 | 9/2007 | Stokes et al. | |
| 2003/0096577 A1* | 5/2003 | Heinonen et al. | 455/41 |
| 2006/0111793 A1 | 5/2006 | Stokes et al. | |
| 2006/0139161 A1* | 6/2006 | Beghelli | 340/514 |
| 2006/0217121 A1* | 9/2006 | Soliman et al. | 455/446 |

FOREIGN PATENT DOCUMENTS

| | | |
|---|---|---|
| AU | 80744/82 | 9/1982 |
| AU | 200054106 | 12/2000 |
| AU | 2003229568 | 10/2003 |
| AU | 2004100525 | 8/2004 |
| EP | 0 062870 | 10/1982 |
| EP | 0 062871 | 10/1982 |
| EP | 0143993 | 6/1985 |
| FR | 2658010 A1 | 8/1991 |
| GB | 2336258 A | 10/1999 |
| JP | 2005 252858 | 9/2005 |
| NZ | 234219 A | 4/1994 |
| NZ | 239665 | 2/1995 |
| WO | WO 02/056622 | 7/2002 |
| WO | WO 2004/008261 | 1/2004 |

* cited by examiner

*Primary Examiner*—Tu X Nguyen
(74) *Attorney, Agent, or Firm*—Hoffmann & Baron, LLP

(57) ABSTRACT

An emergency system for providing an emergency function is described in which the system is required to provide an autonomous and self-diagnostic capability so the system can be tested when not in operation in an emergency situation. A plurality of emergency devices 14 are provided which have transmitters and receivers for producing a mesh network (FIG. 1). Each device 14 has a processor 60 for establishing a preferred wireless communication link of the mesh network to another device 14 for relaying signals and messages. The devices 14 are arranged in subnets 50 and the subnets are also grouped into groups of devices 14 which may cross various subnets 50 so that only one group of devices 14 can be tested at a particular time.

34 Claims, 7 Drawing Sheets

EMERGENCY LIGHTING SYSTEM

CROSS-REFERENCE TO RELATED APPLICATION

This application claims priority to Australian Application No. AU 2006904063, filed Jul. 26, 2006, the contents of which are incorporated herein by reference.

FIELD OF THE INVENTION

This invention relates to an emergency system for providing an emergency function and an emergency device for use in such a system. The invention has particular application, but not exclusive application, to emergency lighting systems.

BACKGROUND OF THE INVENTION

Emergency devices such as emergency lighting for use in buildings and the like are each provided with an autonomous and self-diagnostic capability so that the light can be tested to ensure that it will operate in an emergency situation in the event of loss of power to a building. Typically, tests take place on a routine basis such as a monthly and annual basis. In Australia, standards prescribe tests on a six monthly basis. Data is sent back to a central server for analysis and display so that if a failure is detected, appropriate repairs or replacement can take place.

The emergency devices are usually connected to the central server by a cable such as a twisted pair cable. Such wiring is bulky and not easy to install in old buildings.

SUMMARY OF THE INVENTION

The invention may be said to reside in an emergency system for providing an emergency function, comprising:

a controller;

a plurality of emergency devices, each for providing the emergency function;

transmitters and receivers for producing a mesh network for providing wireless communication of data between the controller and the emergency devices so that the operability of the plurality of emergency devices in an emergency situation can be tested by a wireless signal over the mesh network to the emergency devices to initiate a test operation of the devices and for communicating data relating to the test back to a control receiver;

each device having a processor for establishing a preferred wireless communication link of the mesh network to another emergency device for relaying the signal and for relaying the data to the control receiver, and for establishing an alternative wireless communication link via a further emergency device, if the preferred wireless communication link is inoperative.

Thus, according to the invention, emergency devices can communicate with one another via a wireless over-the-air signal such as an RF signal and therefore hardwiring of devices to one another and back to a central controller is not needed. Furthermore, the devices establish a preferred communication link, and are also able to establish alternative links. If the preferred link becomes inoperative because the signal cannot be transmitted between devices or a controller (because of some infrastructure which may have been provided in the building) or the like, then an alternative path can be established to ensure that the devices do perform their emergency test and do transmit data back to the controller for analysis.

Preferably the controller also comprises the control receiver.

Preferably the processor has a routing table which lists all emergency devices in a subnet of emergency devices, the subnet comprising the said another emergency device providing the preferred control link and a plurality of further emergency devices through which the alternative wireless communication link can be established.

Preferably the processor is also for updating the another emergency device in the event of failure of the initial preferred communication link.

Preferably the emergency system comprises an emergency lighting system for providing emergency lighting in the event of an emergency situation where power to an environment is shut off and the emergency devices comprise emergency lighting devices for providing an exit path from the environment.

Preferably the transmitters and receivers for producing the mesh network comprise a transceiver in each of the emergency devices for receipt and transmission of over-the-air signals, and a transceiver in the at least one controller.

The controller may comprise an area controller and at least one router, the area controller being connected to the at least one router by a network.

The network may be the internet, a LAN, a WAN, or a PSTN, or any other media which can carry IP packets.

In one embodiment the system includes an additional plurality of emergency devices connected to the controller by a communication link formed by a cable. This enables conventional wired emergency devices to also be included in the system if that is desired.

The invention may also be said to reside in an emergency system for providing an emergency function comprising:

a plurality of emergency devices, each for providing the emergency function;

a controller for dividing the plurality of emergency devices into a plurality of different groups of devices;

a transmitter controlled by the controller for transmitting a signal to the devices in only a group of devices to initiate a test operation and so the devices in the group are able to communicate data back to a control receiver relating to the test; and wherein the controller causes only one group at a time to initiate the test operation so that each group can be controlled to perform a test operation at different times.

This aspect of the invention enables different groups of devices to be tested at different times. It is not desirable to test all devices in the one physical area at the same time because at the conclusion of the test, the devices may need to recharge their power supply, such as batteries, and are thus unable to operate in the event of a genuine emergency. Thus, if the devices are allocated to groups, dispersed devices can be tested in a group whilst other devices in close proximity are not tested. Thus, if there is a genuine emergency situation, whilst the tested group are recharging, the devices in other groups are able to operate in the emergency situation and because of their close proximity to the tested device, the failure of the tested device to operate is less likely to create a difficulty. That is, if the devices are emergency exit lights, other devices in the proximity will show the way to the exit and the fact that one device may not operate should not impair operation of the entire system to show an emergency exit path from an environment. On subsequent days, other groups of devices can be tested after sufficient time has elapsed for the previously tested devices to recharge or otherwise recover from the test operation.

Preferably the transmitter is a wireless transmitter for transmitting the signal as an over-the-air signal to the group of emergency devices.

Preferably the controller establishes a preferred wireless communication link so the devices and controller can communicate in a mesh network and wherein the controller establishes a preferred wireless communication link of the mesh network to another emergency device for relaying a broadcast signal applicable to the group of devices, and for relaying the data to the control receiver, and for establishing an alternative wireless communication link via a further emergency device, if the preferred wireless communication link is inoperative.

Preferably the controller also comprises the control receiver.

Preferably the processor has a routing table which lists all emergency devices in a subnet of emergency devices, the subnet comprising the said another emergency device providing the preferred control link and a plurality of further emergency devices through which the alternative wireless communication link can be established.

Preferably the processor is also for updating the another emergency device in the event of failure of the initial preferred communication link.

Preferably the emergency system comprises an emergency lighting system for providing emergency lighting in the event of an emergency situation where power to an environment is shut off and the emergency devices comprise emergency lighting devices for providing an exit path from the environment.

Preferably the transmitters and receivers for producing the mesh network comprise a transceiver in each of the emergency devices for receipt and transmission of over-the-air signals, and a transceiver in the at least one controller.

Preferably the controller comprises an area controller and at least one router, the area controller being connected to the at least one router by a network.

The network may be the internet, a LAN, a WAN, or a PSTN.

In one embodiment the system includes an additional plurality of emergency devices connected to the at least one router by a communication link formed by a cable. This enables conventional wired emergency devices to also be included in the system if that is desired.

The invention still further provides an emergency system for providing an emergency function, comprising:

at least two controllers;

a plurality of emergency devices, each for providing the emergency function;

each controller having a transmitter for providing a signal to the emergency devices for initiating a test operation of the devices;

at least one of the controllers also being for balancing the system by forming a mesh network and for distributing the emergency devices so that there is a balance between the emergency devices which communicate with one of the controllers and the emergency devices which communicate with the other of the controllers.

Preferably the transmitter is a wireless transmitter for transmitting the signal as an over-the-air signal to the group of emergency devices.

Preferably the controller establishes a preferred wireless communication link so the devices and controller can communicate in a mesh network and wherein the controller establishes a preferred wireless communication link of the mesh network to another emergency device for relaying a broadcast signal applicable to the group of devices, and for relaying the data to the control receiver, and for establishing an alternative wireless communication link via a further emergency device, if the preferred wireless communication link is inoperative.

Preferably the controller also comprises the control receiver.

Preferably the processor has a routing table which lists all emergency devices in a subnet of emergency devices, the subnet comprising the said another emergency device providing the preferred control link and a plurality of further emergency devices through which the alternative wireless communication link can be established.

Preferably the processor is also for updating the another emergency device in the event of failure of the initial preferred communication link.

Preferably the emergency system comprises an emergency lighting system for providing emergency lighting in the event of an emergency situation where power to an environment is shut off and the emergency devices comprise emergency lighting devices for providing an exit path from the environment.

Preferably the transmitters and receivers for producing the mesh network comprise a transceiver in each of the emergency devices for receipt and transmission of over-the-air signals, and a transceiver in the at least one controller.

Preferably the controller comprises an area controller and at least one router, the area controller being connected to the at least one router by a network.

The network may be the internet, a LAN, a WAN, or a PSTN.

In one embodiment the system includes an additional plurality of emergency devices connected to the at least one router by a communication link formed by a cable. This enables conventional wired emergency devices to also be included in the system if that is desired.

BRIEF DESCRIPTION OF THE DRAWINGS

A preferred embodiment of the invention will be described, by way of example, with reference to the accompanying drawings in which.

DETAILED DESCRIPTION OF THE PREFERRED EMBODIMENTS

Figure 1:
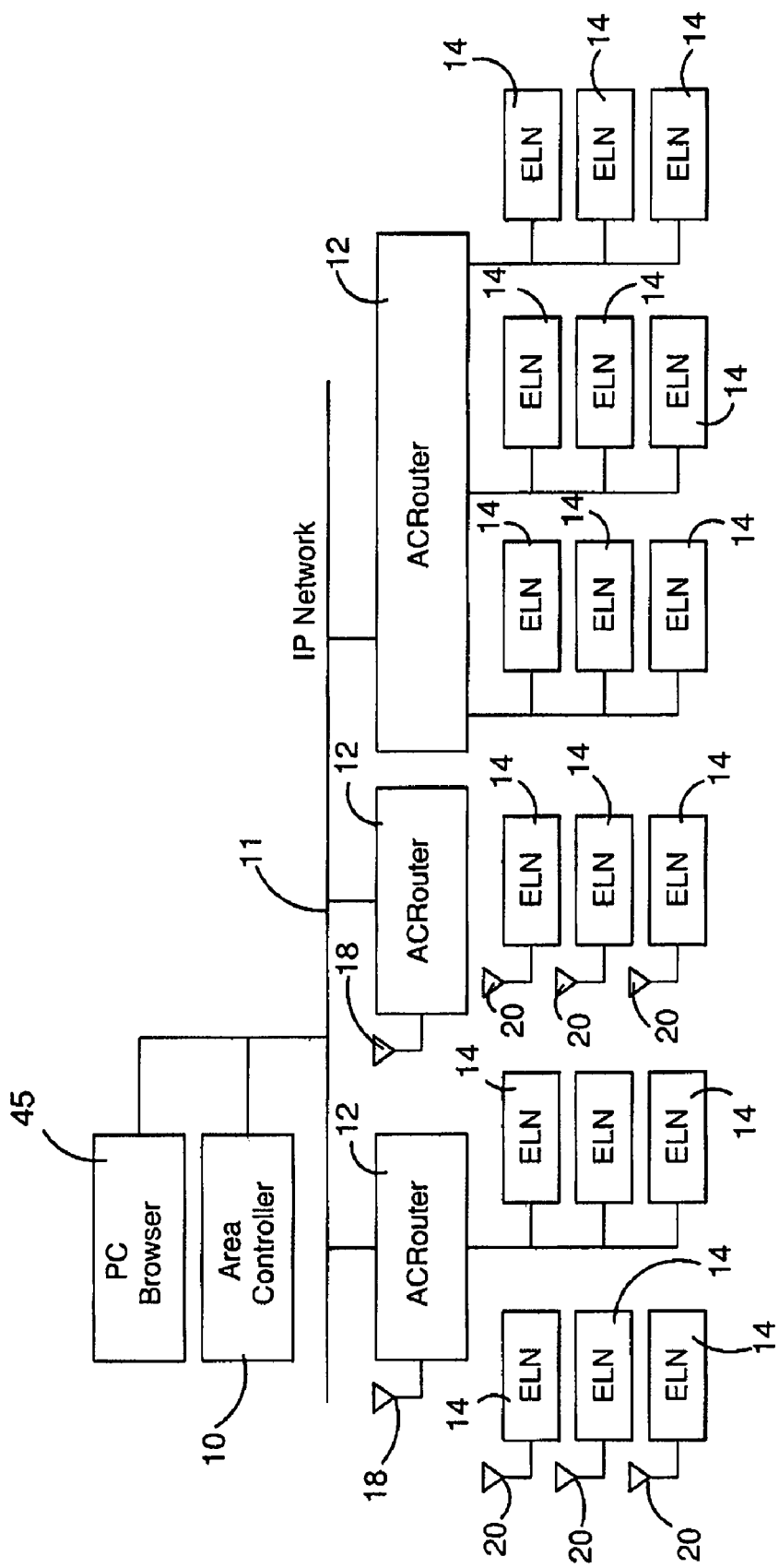
FIG. 1 is a block diagram showing the network structure according to the preferred embodiment of the invention.

With reference to FIG. 1, an emergency system such as an emergency lighting system is shown which comprises a central area controller 10 which is connected to a number of routers 12 via a network 11 which may comprise the internet, a LAN, a WAN, or a PSTN. Other communication networks could also be used.

Each router communicates with a plurality of devices 14. If the system is an emergency lighting system, the devices 14 are emergency lighting devices which are illuminated or remain illuminated in an emergency situation when power is cut off to an area so that the lighting devices 14 are visible and can show an exit path or an exit direction, etc. from a building. Most typically, the devices are exit signs. Other emergency devices include Spitfires (non-maintained quartz halogen incandescent ceiling mounted light fittings), fluorescent battens and Floods (non-maintained twin directional incandescent wall mounted light fittings).

In the embodiments shown, some of the devices 14 are able to communicate with a router 12 via an RF over-the-air signal, and other devices 14 are hardwired to the router by a cable, as is conventional.

By providing devices 14 which are able to communicate with a router via an RF signal or other over-the-air signal, additional infrastructure such as cabling need not be installed in a building if an existing building is to be retrofitted with an emergency lighting system. However, some embodiments do provide for conventional cable connection of devices 14 to a router 12 if that is something which can be easily done or is preferred for some reason.

The routers 12 which are able to provide over-the-air communication to a device 14 are provided with a transceiver schematically illustrated in FIG. 1 by aerial 18 and the devices 14 are also provided with a transceiver schematically illustrated by aerials 20 in FIG. 1.

Figure 2:
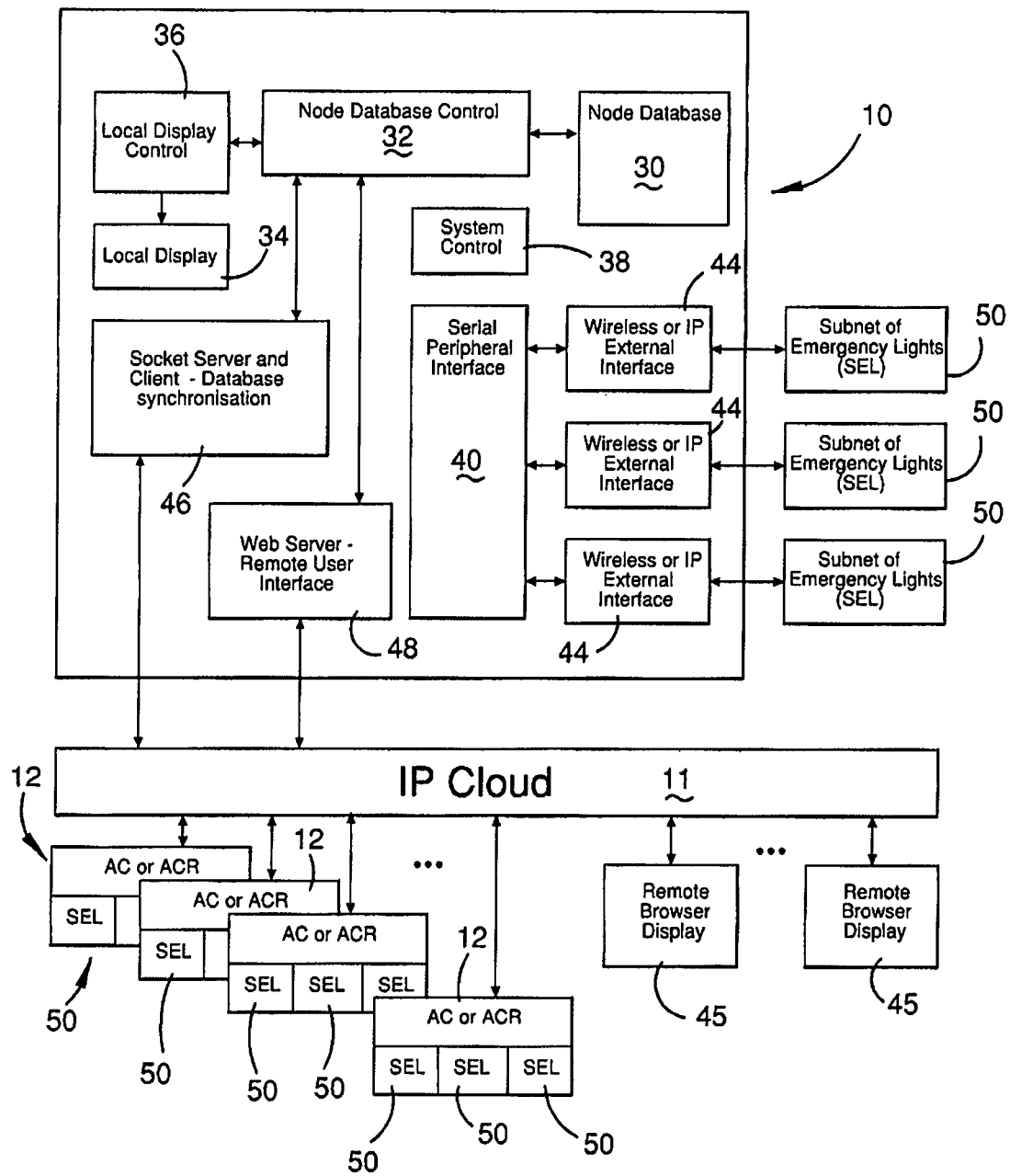
FIG. 2 is a block diagram showing the system of FIG. 1 in which an area controller/router is shown in more detail.

FIG. 2 is a block diagram which shows an area controller 10 in more detail. Router 12 has the same structure as the area controller 10 but generally will be supplied without a display, keypad or batteries and it may have less installed flash memory or random access memory.

The controller 10 has an emergency device database 30 which is controlled by a database control 32 and a display 34 which is controlled by a display control 36. A system controller or processor 38 controls the control 32 and also a peripheral interface 40 which provides communication to a wireless or fixed wire interface 44. In the embodiment shown, three such interfaces 44 are provided for communicating with a subnet of lighting devices 14, as illustrated by reference numeral 50 in FIG. 2. Thus, each subnet 50 may comprise six to ten devices 14. However, the number of devices in the subnet 50 is arbitrary and can be more or less as required. The number of devices which are connectable to an area controller or router is limited by the subnet addressing limit which is 8 bits (i.e. 256 devices) for wireless devices and 7 bits (i.e. 128 devices) for wired devices. As is apparent from FIG. 2, the area controller 10 can communicate direct with a subnet 50 of emergency lighting devices 14 and also via the network to routers 12 which in turn communicate with subnets 50 of emergency lighting devices 14.

A user of the system may have a remote browser display such as a PC 45 which can communicate with the controller 10 via the communication network 11. A number of such PCs 45 may be provided, as shown in FIG. 2. The PCs 45 enable communication with the area controller 10 via the network 11. The controller 10 has a remote user interface 48 for receiving commands from the PCs 45 and a socket server 46 for receiving data from peripheral devices such as modems, printers, keypads, a mouse, etc. for supplying data and commands to the controller 10. Thus, the web server is a program running on the area controller 10 which provides a remote user interface facility so a remote user can connect his web browser via a TCP/IP connection to this server. The socket is a virtual connection point in TCP/IP—the communication protocol running on the network 11. The server is a program running in the background within the area controller or router which sends data from the database via the socket to other devices running elsewhere on the network 11. Another program runs on the area controller for receiving data from a server running elsewhere on the network 11 via the socket.

Thus, a user can input data and control signals to the controller 10 via the display 34 which may have a touch screen, or from a PC at a remote location, or from one of the other peripheral devices which communicates via the interface 48.

The interfaces 44 comprise a transceiver for transmission and receipt of wireless signals such as RF signals to and from the devices 14 in each of the subnets 50, and may also include a fixed cable input for receiving and supplying data over a conventional cable to devices 14 if that is desired.

The interfaces 44 may comprise a 900 MHz wireless interface which provides the wireless communication, a Lonworks TPZF78 data cable interface, and a digitally addressable lighting interface. Other modules can also be used, such as a fibre optic module or the like. The wireless module may comprise a micro-controller (not shown) and a 900 MHz RF transceiver (not shown) for providing and receiving over-the-air signals.

The subnets 50 of emergency devices 14 comprise a number of devices 14 that are directly connected to one of the module ports to which the modules 44 are connected. For example, in the case of a Lon subnet, all the devices 14 are connected to the same twisted pair data cable and they all direct their responses back to the particular Lon interface module. In the case of a wireless subnet in which all of the devices 14 communicate by wireless signal, they all operate on the same wireless channel and they all direct their responses back to the particular interface module providing the wireless communication. Adjacent wireless subnets can operate on different wireless channels. The wireless network is a mesh network—messages can be relayed from source to destination by being passed between intermediate nodes (i.e. devices 14). There is nothing to say that the message must go back to a central controller or be relayed via a central controller—the message transfer can be peer to peer. Similarly the messaging on the cable based network can also be peer to peer. Generally speaking for emergency lighting testing the messages are sent between an ACR and connected nodes, however the network may also be used for peer to peer control for other purposes such as security monitoring or lighting control.

Figure 4:
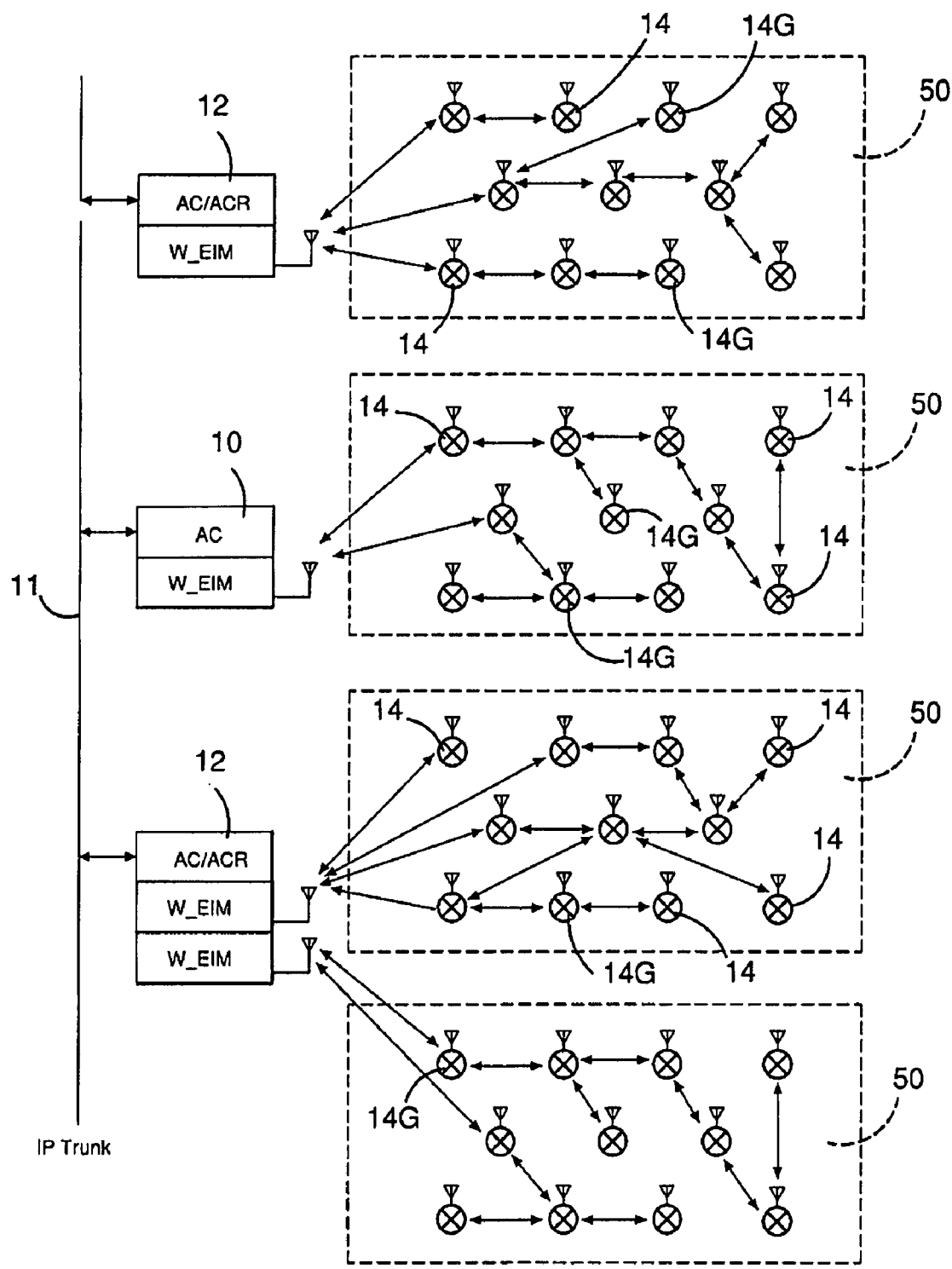
FIG. 4 is a diagram illustrating a mesh network in accordance with the preferred embodiment.

As well as providing the devices 14 in subnets of devices 14, the devices 14 are also arranged in groups. A group of devices 14 can be made up by devices 14 from any one of the subnets and may comprise one or two devices from each subnet. For example, subnets 50 are shown in FIG. 4 in the dotted boxes. A group of devices 14 may comprise those labelled 14G in FIG. 4. As is apparent, the group may comprise devices 14 which are from a number of different subnets 50. Thus, a group of devices 14 is a collection of devices within the same domain, where the domain is the collection of all the devices in the network. A group address is useful when it is desired to require a specific collection of devices 14 to do the same thing at the same time, such as commence a test operation. Devices 14 usually belong to a particular subnet because of physical proximity, but a required function such as a test may want to group devices 14 according to some other parameter. In the case of an emergency lighting test, it is not desirable to test all units in the one physical area at the same time because at the conclusion of the test, the devices 14 spend the next day recharging their batteries and are thus unable to operate in the event of a genuine emergency. Thus, if the group is dispersed throughout the system, as shown by the devices 14G in FIG. 4, that group can be tested at one particular time. Thus, if there is an emergency situation within the next day whilst that group of devices is recharging, the failure of those devices to operate in a particular proximity should not create any difficulty because there will be sufficient other devices within the subnet (or that particular proximity) which will be easily able to display the exit path from a building or the like. Thus, the inability of some of the devices 14G to operate will not impair the overall emergency response of the system and an emergency exit from any particular location in a building will still be displayed by others of the devices 14.

Figure 3:
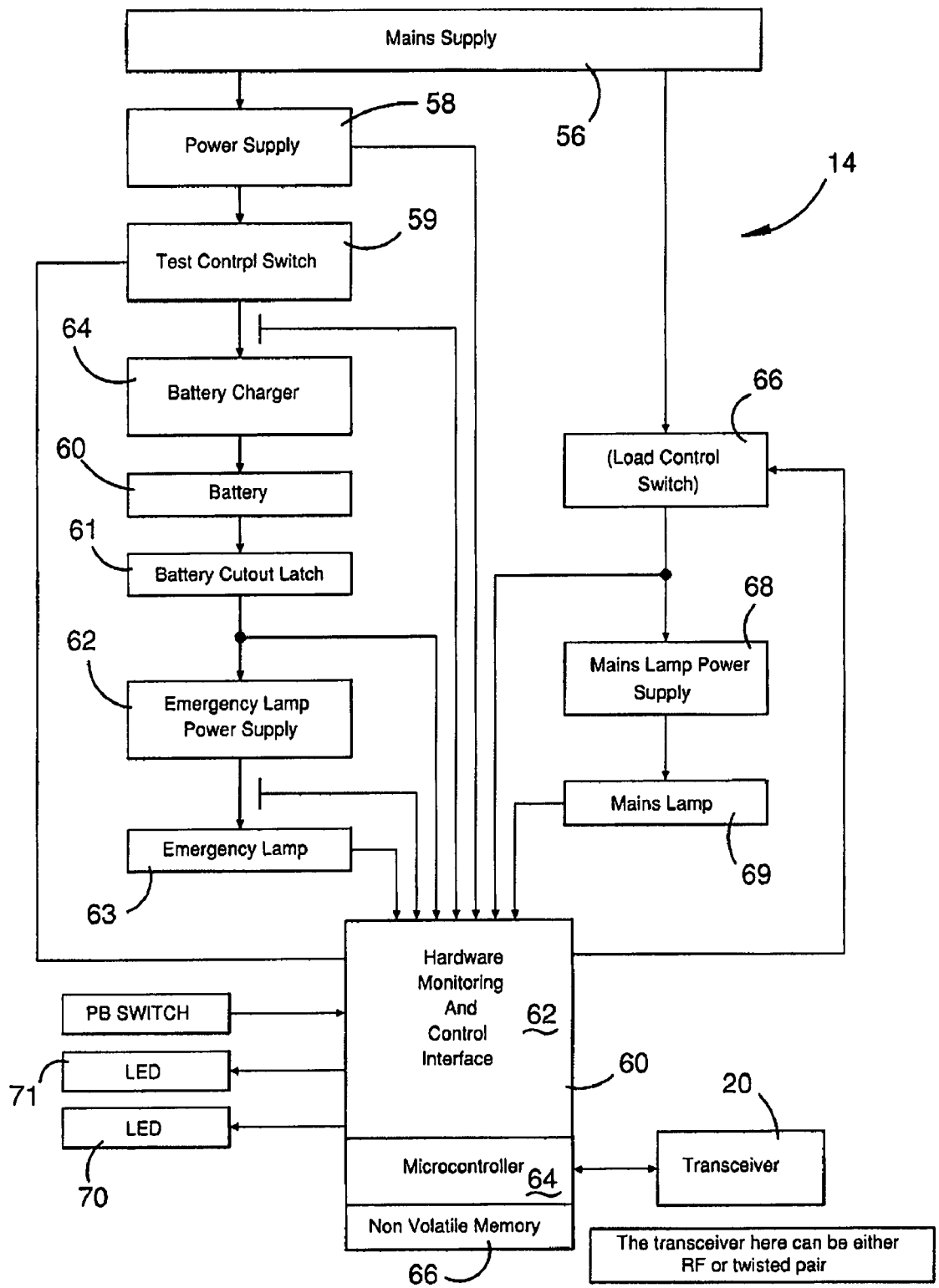
FIG. 3 is a block diagram of an emergency device according to the preferred embodiment.

FIG. 3 shows the emergency lighting devices 14. The devices 14 have a mains power supply input 56 for supplying power for normal operation of the device 14 from a mains power source (not shown) so that an exit light is displayed during normal operation of the device 14. The mains supply 56 is connected to a power supply 58 for supplying power to the device and, in particular, to a processor 60 which has a control interface 62 and a microcontroller 64 which is provided with a non-volatile memory 66. The microcontroller 64 controls the transceiver 20 previously described with reference to FIG. 1. The device 14 also has a test control switch 59 which is activated in the event of a test procedure to ensure that the device 14 will operate if mains supply power 56 is disrupted in an emergency situation. The switch 59 effectively cuts out mains supply 56 during a test so the device 14 can be tested as if it were in an emergency situation. The test procedure and the manner in which it is conducted is conventional and therefore will not be described in detail herein.

However, suffice it to say that when the transceiver 20 receives a signal from the controller 10 or a router 12, the processor 60 activates the test control switch 59 so that power is supplied from battery 60 to battery cut-out latch 61 and then to emergency lamp power supply 62 to power emergency lamp 63 to maintain the device 14 illuminated.

Proper operation of the emergency lamp 63 in the simulated emergency condition is monitored by sensors and the like (not shown) and data is collected by the controller 60 for transmission back to the area controller 10 via transceiver 20. In normal operation, a battery charger 64 is provided for charging the battery 60 to maintain the battery 60 charged for use in an emergency situation when mains supply power 56 is not available. Mains supply power from supply 56 is normally used to operate the device 14 and is connected to a load control switch 66 and then to a mains lamp power supply 68 to power a mains lamp 69 during normal operation of the device 14. Light emitting diodes 70 and 71 may be illuminated under the control of the processor 60 to illustrate operation of the device 14.

As is shown in FIG. 4, the area controller 10 and routers 12 communicate with one another via network 11 and supply over-the-air wireless signals to the emergency devices 14. As previously explained, each of the devices 14 is allocated in a subnet 50 of devices 14. The subnet may have a predetermined number of devices 14 and the provision of subnets of devices serves to allocate various ones of the devices 14 into particular groups so that groups of devices 14 can be tested as is required, to provide more flexibility over the test procedure. Thus, one group of devices 14 could be tested, a number of groups of devices 14 could be tested, or all groups of devices 14 could be tested at any one time.

The wireless communication band is divided into a number of channels and each wireless interface module 14 in each controller or router initiates its mesh network using the quietest channel available to it. Unattached devices 14 join the subnet that offers the strongest signal. A new device 14 broadcasts a signal advertising itself as wanting to join a network. Other devices 14 already connected to the network may respond if allowed to. Devices 14 belonging to a full subnet will not invite a new device to join. Devices that are already supporting a large number of mesh connections will not invite the device 14 to join so as to avoid bottlenecks in the mesh. Devices joining a network will choose the subnet that offers the best signal and the lowest hopcount back to the area controller 10. A weighted sum of factors including signal strength, channel noise, hopcount and subnet population can be used to determine which subnet the device 14 joins. After formation of the mesh network, the network can be balanced using the area controller 10 so that the area controller forces devices 14 to detach after which they will reattach according to the communication algorithm which provides for the manner in which devices 14 should communicate with one another. As is apparent from FIG. 4, the controller 10 and routers 12 communicate with devices 14 which are in relatively close proximity and then those devices 14 are able to communicate with surrounding devices 14 so that a signal is transmitted to all of the nodes 14 by making up the mesh network and data can be transmitted from the nodes 14 back through the mesh network to the routers 12 and then to the area controller 10 or direct back to the area controller 10.

Figure 5:
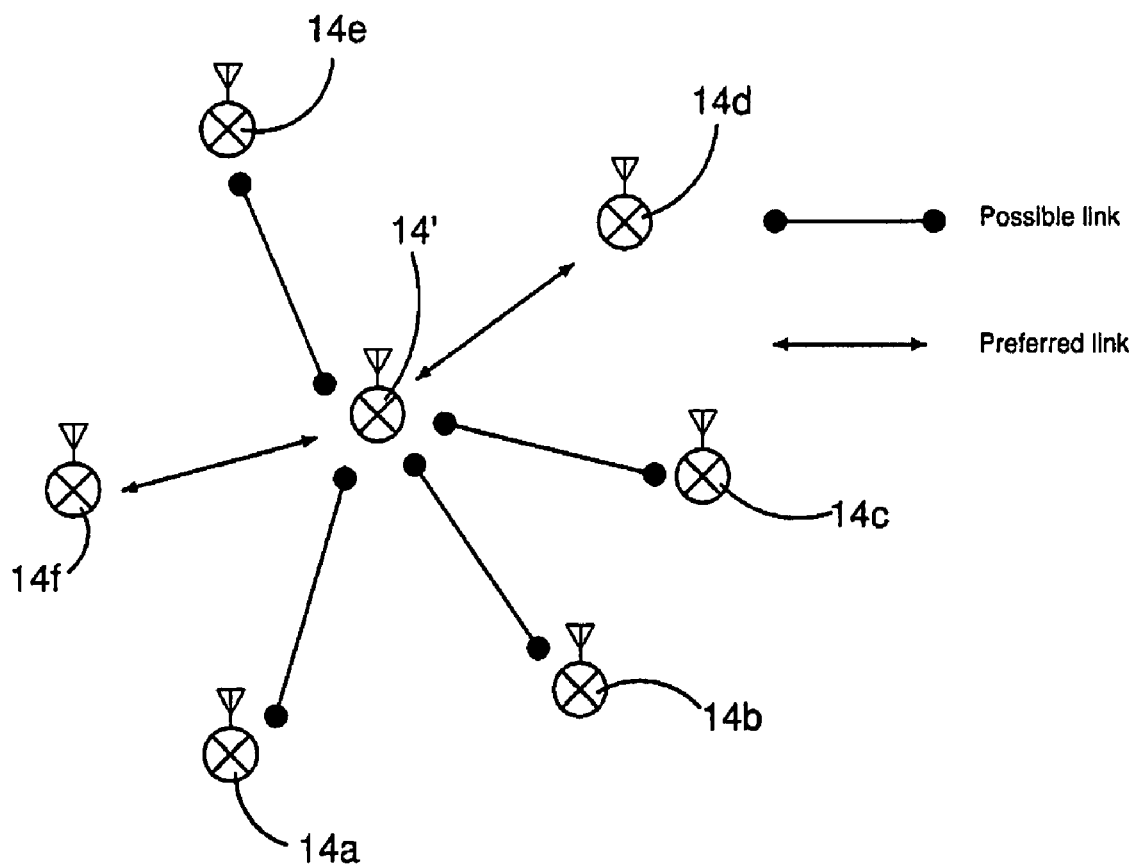
FIG. 5 is a diagram illustrating a preferred communication link and possible link established between an emergency device and surrounding devices.

As is shown in FIG. 5, a device 14' is shown which is able to receive a signal from surrounding devices 14a, 14b, 14c, 14d, 14e and 14f. As is apparent from FIG. 5, a number of possible links to the node 14' is possible. However, at any one time, only a subset of those links are enabled, such as the link between the device 14f and 14' and between the device 14d and 14' which form preferred links for communication to and from the device 14'.

Each device 14 maintains a routing table which lists all devices in the subnet together with the preferred first intermediate node to which a message must be sent in order to be relayed to its final destination. In the case of FIG. 5, the first intermediate device may be the device 14f. If the destination node is unknown, the device 14' sends out a broadcast message which will discover the best path to the destination address and an alternative link is therefore established, such as from the device 14' to the device 14d, or perhaps even from the device 14' to the device 14b, etc. The preferred link to the device 14f may become unreliable or completely inoperative because of additional infrastructure built into a building after installation of the system, such as installation of additional walls, storage cabinets or other devices which may block good transmission of the RF signal between the devices. If this is the case, the device 14' is able to consult its routing table to determine other devices in the subnet and establish the best link to the destination address via one of those other devices. Thus, an alternative communication link is established and the routing table of the intermediate devices is updated to show that particular link may now be the preferred communication link to and from the device 14'.

At least one of the controllers 10 or routers 12 in the system provides for balancing of the system so that the subnets of devices 50 are distributed relatively evenly throughout the system. For example, if all of the devices 14 in a building have been installed and powered up, at some point in time after this, a single router 12 is installed and powered up. The router 12 will initiate a network formation and a mesh network will form automatically with the router 12 at its centre. The network formation will only stop when there are either no more devices 14 within the communication range, or the subnet 50 is full to its addressing limit (which, for example, may be 255 devices 14). When a device 14 joins a network, it will choose the subnet 50 which offers the strongest communication link and most efficient communication path with the lowest hop count (that is, the number of sequential links from a device 14 to each router 12 through the mesh network). With only one subnet on offer, the device 14 has no choice but to join that subnet. If the mesh network has formed to the extent that it can, but there are still devices 14 left unattached, a second router 12 is powered up and it will attempt to form its own network, but it will most likely be able to collect only a small number of devices 14. Some of the devices 14 belonging to the first subnet would be better off connected to the second subnet and therefore the controller 10 or router 12 allocates some of the already allocated devices 14 in the first subnet to the second subnet. This therefore balances the network so that both controllers have a similar number of devices 14 in their various subnets.

The subnet balancing can be performed automatically or semi-automatically. If a semi-automatic system is used, a user can view all the subnet memberships of a particular router 12 and can rank the devices 14 in order of their connection quality using signal strength and hop count. Devices 14 with poor communication which belong to overpopulated subnets 50 can be removed from that subnet. They will then attempt to join the best available subnet 50 on the basis of signal strength and hop count.

As is apparent from the previous description, each of the devices 14 is provided with a physical address. The address is a single point unit identifier such as SPU_1, SPU_2, etc. Generally, speaking, the addresses are sequential numbers and unique within a single network. An additional identifier is applied to data cable connection devices 14 which is referred to as the channel sequence number. The channel sequence number consists of the number of the physical channel the device is attached to, together with the sequence of the device 14 along that channel. For example, 12_23 would be the 23rd device on channel 12 counting from one end. This number is an aid to locating any fault in the data cable. In the same way, each area controller 10 or router 12 will have a physical address AC_l, ACR_2, AC_3, etc. All these numbers refer essential to the physical location of the installed device and will remain fixed, even if the device itself is replaced with a new one.

Each device 14 also has a network address which consists of a subnet number (1 to 3 bytes) which is network unique and a device number (1 byte) which is subnet unique. The network address if fairly dynamic and may change as the network topology changes. The device 14 itself has a MAC address of 8 bytes long and is unique worldwide. The device 14 may also have a group address of two bytes for the purpose of location independent addressing, as previously described in relation to the communication with groups of nodes. The area controller 10 or router 12 consists of a standard IP address of 4 bytes.

The physical address of the devices 14 is related to the network address by commissioning. It is generally possible to form a network that has full communications without actually knowing where any of the devices 14 are physically located. For instance, one could know that the emergency device 14 with network address 12.37 has a fault, but have no idea where to walk to either fix the device 14 or replace it. Only by associating the network address and the physical address in a database is it possible to actually locate the position of the device 14 within a building. The database 30 shown in FIG. 2 lists each device 14 on the network together with its network and physical addresses and associated description, operational status, test status, test schedule and maintenance history. This is the master copy of this database. Other routers 12 in the network will maintain copies of this database. Generally speaking, the area controller 10 and the routers 12 are connected to a trunk (such as network 11) but are not necessarily in continuous communication, depending on the nature of the trunk. A local area network based trunk connection is likely to be continuously available, whereas a dial-up modem trunk connection will not. Whenever possible these databases will be synchronised (i.e. updated so that they are all the same) under the control of the area controller 10.

Each area controller 10 or router 12 can operate autonomously. For instance, they will send out test commands to devices 14 as appropriate according to the locally stored test schedule. This does not require a trunk connection at the particular moment. Test results are uploaded from devices 14 and stored locally. The results will become available to the central controller 10 when the databases are synchronised, which will happen automatically whenever the trunk connection is made.

A message can be sent to an individual device 14 using a subnet/device 14 addressing or MAC addressing procedure. When a device 14 receives a message, either from the data cable or the wireless communication, it compares the subnet/device address (e.g. 12.37) with the subnet/device address in the device 14. If the addresses match, then the device acts on the message. If not, the device either ignores the message or, in the case of a wireless device 14, it passes the message onto the next device 14 in the mesh if appropriate.

A message can be sent to all devices using broadcast addressing. In order to send a message to a group of devices 14 that are possibly in more than one subnet 50, then a combination of subnet/device and broadcast addressing can be used. For instance, a broadcast message could include a group reference in its header. All devices receive broadcast messages. When a device 14 compares the group address in the message with the same internally stored list of group memberships, it can act on the message if it finds the destination group is in that list. The less desirable alternative is to send subnet/device messages to each member of a group. This method results in much more network traffic but has the advantage of allowing acknowledgments to each message.

Figure 6:
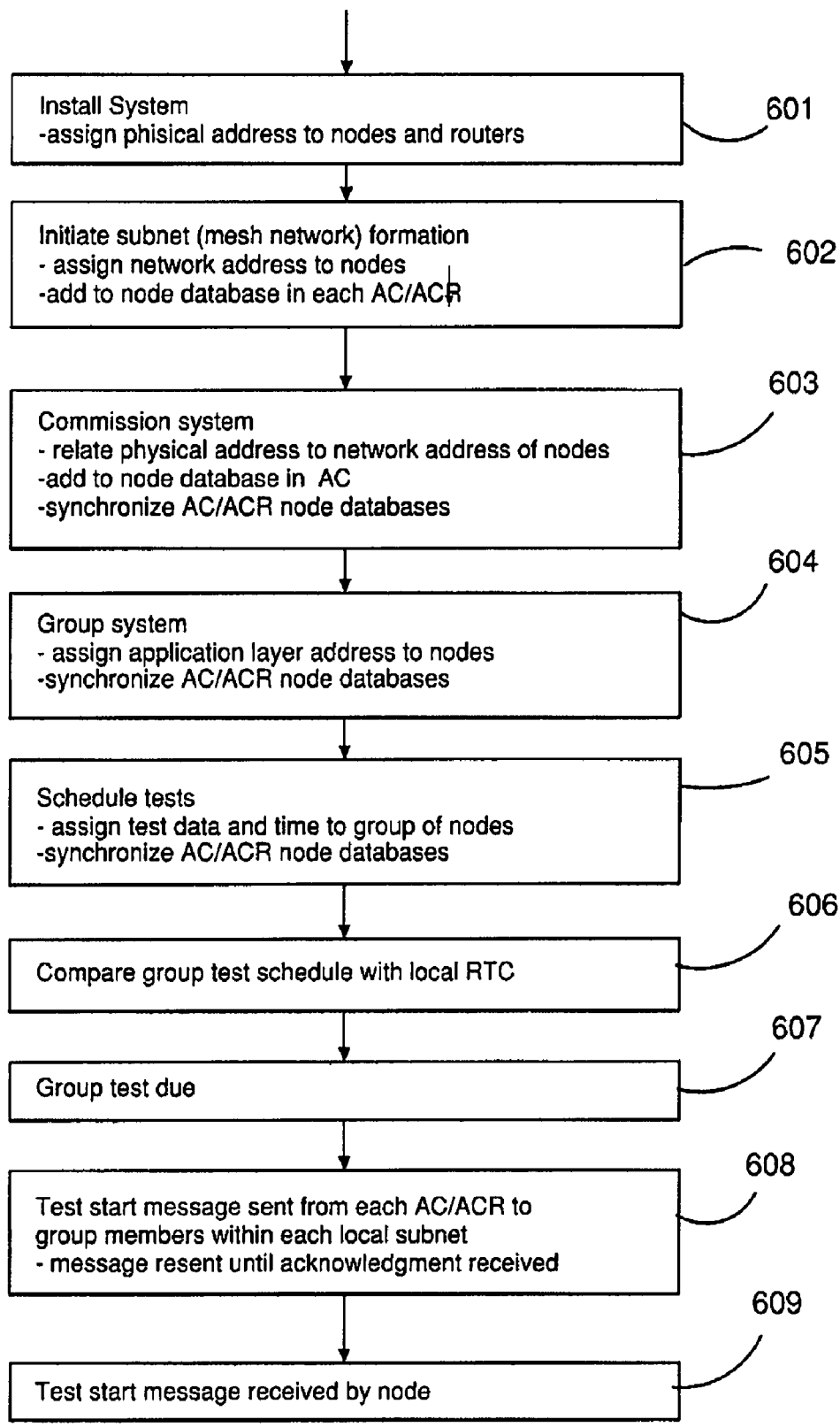
FIG. 6 is a flowchart showing how a test is initiated according to the preferred embodiment of the invention.

FIG. 6 is a flowchart showing test initiation of the system. At step 601 system installation takes place and physical addresses are assigned to all the emergency devices 14 (nodes) and to the routers 12. At step 602 a subnet of devices 14 is established and a network address is assigned to each of the devices 14. The network addresses are then added to the node database 30 in the controllers 10 and routers 12. At step 603 the system is commissioned by relating the physical addresses of the devices 14 and routers 12 to the network addresses of devices 14 and that information is loaded into the node database 30 in FIG. 2. At step 604 groups of devices 14 are established from the subnets of emergency devices previously mentioned. An address identifying the particular group is assigned to each of the devices in the group and that data is also added to the database 30 to identify the various groups and the emergency devices 14 in those groups. At step 605 the test date and time for a scheduled test for each of the groups of emergency devices is established and that information is added to the node database 30.

At step 606 the group test schedule established at step 605 is compared with a local RTC (real time clock). At step 607 a determination is made as to whether a group test is due. If so, at step 608 a test message is sent from each of the controllers 10 and routers 12 to emergency devices 14 within the relevant group or groups within each subnet 50. The message to start a test is continually sent until a message is received back acknowledging the message to start the test has been received. At step 609 the test start message is received by the node 609 as the test is commenced.

Figures 7, 8:
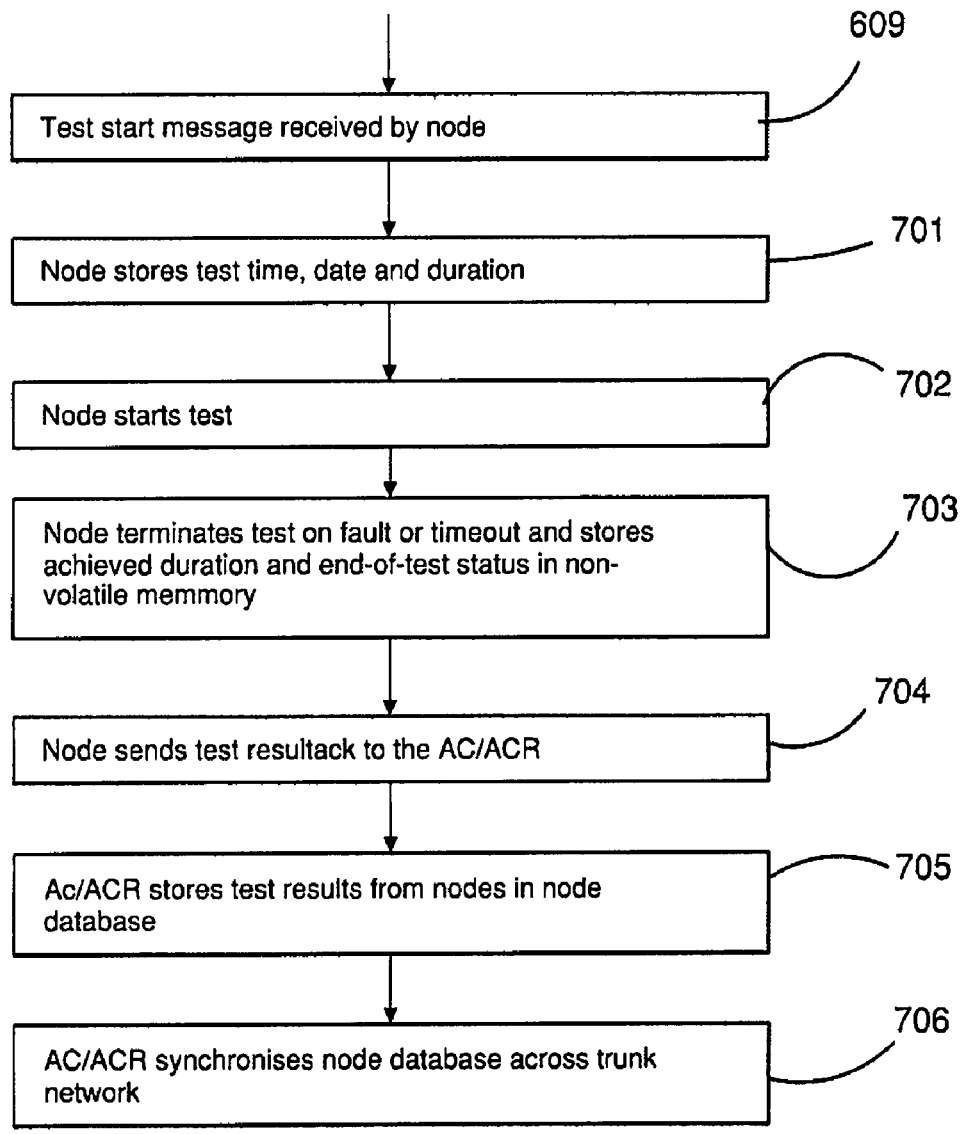
FIG. 7 is a flowchart showing the execution of a test according to the preferred embodiment of the invention.
FIG. 8 is a block diagram used to illustrate how units of a matrix communicate.

FIG. 7 is a flowchart showing how the test is performed. Step 609 is the same as that in FIG. 6. After the test start message is received by the devices 14, the devices 14 at step 701 store the time date and duration of the test and at step 702 the test commences at the time established at step 701. The test is then commenced and the device 14 terminates the test if the device 14 is faulty or the duration of the test expires and stores the test duration and the test results in non-volatile memory 66 within the device 14 as per step 703. The device 14 then sends the test results back via the transceiver 20 through the mesh network established by the devices 14 to the controller 10 or router 12, as per step 704. At step 704 the controller 10 or router 12 stores the test results in the database 30 for analysis. At step 706 the node databases 30 are synchronised across the network 11.

Typically, in a test procedure a device 14 is required to operate on battery power for at least 120 minutes when new or 90 minutes for any subsequent test. However, these time limits can vary as required.

The emergency devices 14 include a circuit to turn the lamp off when the battery voltage falls to a certain limit. This is to prevent damage to the battery that can occur due to over-discharge. Therefore, a healthy unit will run for some time beyond the mandated time limit and will eventually turn off when the battery is finally exhausted. If the unit is faulty, the battery may run flat only after a short period, or the lamp may fail. When a test is commenced, a relay in the device 14 is operated to remove power from the battery charger—the effect is the same as if the mains had failed except that the monitoring circuits are still powered. At the end of this test, this relay is allowed to return to its normal state. There are three events that result in the end of a test. The first is that the monitoring circuit detects that the battery cut-off circuit has operated. The second is that the monitoring circuit detects that the current to the emergency lamp falls below the threshold. The third is that the test time, times out. Included in the signal to start the test is an absolute time limit. When the test starts, the processor starts a timer set to this value. When the timer expires the test is terminated, assuming that it is not already terminated by the other two possible events. Thus, at step 703 the termination of the test is determined based on these three requirements.

The system protocol for the system described above will be described below. It should be understood that the reference to nodes in the following description is a reference to the devices 14 described above.

The protocol has three layers, the MAC layer, the routing layer and the link layer.

The MAC layer is responsible for the transfer of data between two units 14 (nodes) that are within radio distance. The routing layer collects the information about the possible connections between the nodes and works out the paths of messages from any node to any other node. The link layer provides a delivery service for messages between any two nodes.

The MAC layer is based on the MACAW protocol, which in itself is based on the MACA protocol.

If four radio nodes are in a straight line (i.e. nodes A, B, C and D) and placed in a way that A can talk to B, B can talk to A and C, C to B and D and D only to C, i.e. they can only hear (and reach) their immediate neighbours.

When B wants to talk to C, then D must not transmit, because if B and D transmits data in the same time, they interfere with each other at C's location and thus C will not be able to listen to either one of them. Thus, when B wants to talk, it transmits a very short message in which it advertises that it wants to send a message of length L to C. If C can hear that message, it also sends a very short message telling that it is ready to receive the length L message from B. Then B can send the message. The way this short exchange solves the interference problem is the following: When B sends the short message to C, that message can be heard by A and C, but D can not hear it. However, when C sends the short response to B, that will be heard by D as well. If a station hears a short message (that is not directed to it) it will refrain from transmission for the duration of a message with length L. Therefore, all the stations around B within radio distance will remain silent for the entire transaction upon hearing the short message from B to C and similarly, all stations within radio range of C will mute when they hear C's short response to B. This little message exchange thus creates a "cone of silence" around the two messaging parties. Stations that are not in radio range of either B or C can keep using the radio because they do not interfere the B to C transmission. In practice the situation is more complex and channel utilisation can be increased by using some other short message types. It should be noted that collisions could still happen but the short message exchange significantly decreases the collision probability.

As it will be clear from the routing layer's description, a message from a node to an other node has a non-negligible chance to get lost. The link layer keeps track of what messages have been sent and expects the addressee to acknowledge their arrival (by sending short messages back to the sender). When messages are lost, the link layer on the sender will re-send them, until they get acknowledged by their target. In turn, the target filters out the messages that arrive in duplicate (due to the their acknowledge getting lost). The link layer is a very simplified variation of the TCP protocol used on the Internet, with only the bare skeleton of TCP's operation kept. However, the link layer uses absolutely nothing that hasn't been in use for more than several decades in almost any telecommunication system.

Since any node can only hear a few other nodes, messages must be forwarded to their final destination by interim nodes. In the A, B, C, D nodes example, if A wants to send a message to D, it has to send it first to B, since that is the only node it can talk to. B in turn has to pass the message to C because B itself can't talk to D. Then C will finally deliver the message to D. Naturally, this process assumes that the nodes know where to send a message with a given destination address. Working out the next hop for a message is called routing.

In the preferred embodiment of the invention the specific requirements are the following:

The traffic is low volume

The traffic is intermittent

The traffic is mostly between a central node and other nodes

The nodes have very modest amount of memory and thus they are severely limited in what they can do and how much information they can store.

Due to the traffic being oriented to and from a central node, that node has to be able to handle all traffic from all other nodes. Since it only has one radio, it means that the central node is a congestion point. Therefore the network is limited to 127 nodes, including the central one. If the application needs mode than that many nodes, then multiple central nodes can be deployed and connected to each other by a backbone network. They can operate simultaneously and each control up to a maximum of 126 other nodes.

All nodes have a unique number in them, called the MAC address. It is guaranteed that no two nodes are manufactured with the same number. The MAC address is 32 bits, meaning that it is enough for some 4 billion units. Since the MAC address is unique, it could be used as a network address as it unambiguously identifies a particular node on the network. However, that would require all nodes to store all the MAC addresses on their network, so that they can work out the routing of the packets (messages). Furthermore, the MAC addresses should be in the packets as well, as any network packet shall contain the sender and recipient addresses. Therefore we decided that instead using the MAC address, we will use a node address, a number between 1 and 126 to identify the nodes. When a node wants to join the network, it has to ask for a node address. Node addresses are allocated by the central node of the network. The central node, that has more resources than the other nodes, can store the MAC addresses and map them to node addresses. The other nodes do not have to know the MAC addresses, it is enough that they know the node address. The centralised allocation of node addresses also ensures that within the network they are just as unique as the MAC address but they only require one fourth of the space of a MAC address.

In addition, we have to identify the central node that assigned a node its node address. We call this identifier the network address. Nodes only listen and respond to messages that are originated by a node with the same network address, that is belong to the same central node. It is the responsibility of the central nodes that they negotiate unique network addresses using their backbone network.

Since it is possible that two independent systems operate within radio distance of each other, there could be a possibility that two central nodes on the two systems would choose the same network address. To avoid that possibility, we also use a further number, the system identifier, to distinguish between independent installations. The system identifier must be assigned by the installer and the nodes of the network (central or otherwise) have no say over the system ID they use. The system ID of a node is set during manufacturing or by a human operator on the field. The network itself has no authority or mechanism to change this number.

Table 1 summarises the various addresses used by the system:

TABLE 1

| Field | Uniquely identifies | Assigned by |
|---|---|---|
| MAC address | A physical device | Manufacturer |
| System ID | An installation | Installer or manufacturer |
| Network ID | A central node within an installation | Negotiation between the central nodes over the backbone |
| Node ID | One of the 126 slave nodes belonging to a central node | The central node |

When a node is turned on and wants to join a network, it (by means explained later) looks for a node that is already on the network and is willing to help the newcomer to join. The new node first has to obtain a node ID. Since the node ID is allocated by the central node, the now node most reach the central node and ask for an address and the central node has to send a response that must be delivered to the new node. However, since the new node does not yet have an address, the network does not know how to route messages to it. To solve this problem we use a temporary addressing scheme. The new node, when it finds a node willing to help it, will temporarily assume the address of that node+128. That is, if the helping node has a node address of 5, the new node will assume the address of 5+128=133. When a node in the network encounters a message with that number, it will know that that is a temporary address, since the central node never allocates an address larger than 126. Thus, it can subtract 128 from the address and get the node address of the node acting on behalf of the newcomer. Therefore all messages with addresses over 128 are treated as if they were 128 smaller—that is, as if they were messages from and to the helper node. Only the central node and the helper node itself will distinguish between the helper and the newcomer. When the central node allocates a new address and sends it to the newcomer, that messages will be delivered to the helper node and the helper node will then realise that the message is not for itself, but for the newcomer. It will then forward the message to the newcomer. At that moment the newcomer becomes a proper member of the network, with its own unique node address in the range of 1 to 126.

The node address is one byte. A byte can represent numbers between 0 and 255.

Table 2 shows how we allocate these numbers:

TABLE 2

| Addresses | Function |
|---|---|
| 0 | Central node's address |
| 1-126 | Nodes on the network |
| 127 | Backdoor address |
| 128-254 | Temporary addresses |
| 255 | Broadcast address |

The backdoor address will be explained later. The broadcast destination address identifies packets that are not meant to a particular node but to any and all nodes that can receive it.

A packet on the network has two addressing fields in it. When a node wants to send a message to a node that it can directly talk to, it has to use the short message exchange to guarantee radio silence for the duration of the transfer. Therefore, every radio packet on the network has a MAC layer address header which has the fields (collectively called the MAC header) set out in table 3:

TABLE 3

| Field | Meaning |
|---|---|
| type | Describes the type of the packet |
| system ID | Identifies the system of the sender |
| network ID | Identifies the network (central node) of the sender |
| source | The node ID of the transmitting node |
| destination | The node ID of the receiving node |
| data size | The size of the data that is/will be transferred |

The short messages used to guarantee radio silence do not have any data field, so they consist of nothing more than the header described above. A message with useful data in it, however, needs more address fields. In particular, the source and destination addresses identify the two nodes taking part of a single message transfer through the radio. In the ABCD nodes example, when A sends a message to D, as part of the delivery process at one stage B will send the data packet to C. To assure radio silence they will use the node addresses of B and C in the source and destination fields of their messages.

To know, however, who sent the data in the first place and where should it go ultimately, the actual data message needs further information to be embedded in it. Therefore, data messages also carry the following extra information (called the routing header) as set out in table 4:

TABLE 4

| Field | Meaning |
|---|---|
| type | Describes the type of the payload |
| sender | Node ID of the originating node |
| recipient | Node ID of the final destination node |
| hop count | How many times it was forwarded |
| payload size | The actual size of the useful data |

From the MAC layer's point of view the routing header is just part of the data it has to deliver to the next node. The MAC layer is only able to deliver messages to a neighbouring node (i.e. a node within radio distance). It also filters out messages from other system IDs and network IDs, so the transport layer does not even have to know that such concepts exist at all.

When the MAC layer passes a packet to the transport layer, first the recipient field is checked to see if the final destination of the packet is this node. If not, then the routing table is consulted to see if the current node know how to forward a message to the final destination. If yes, then the hop count in the message is increased by one and the message is passed back to the MAC layer with an instruction to deliver it to a specific node within radio distance. The routing table is basically a map, which for every node ID contains an other node ID. These second node IDs are all within radio distance and identify a neighbour node which is closer to the final destination than this node. For example, the routing table of node B in the ABCD is shown in table 5:

TABLE 5

| Final dest. | Forward to |
|---|---|
| A | A |
| B | — |
| C | C |
| D | C |

B can talk to A and C. Therefore, messages to A and C should be delivered to them directly. A message to B is not forwarded, since it is used locally. A message to D should be sent to C since C is closer to D than B.

The property of that kind of routing is that a decision is always local. When B receives a message to D, it decides to forward it to C. What C will do with the message is C's problem and B doesn't care. All it cares about is that as far as its routing table knows C is closer to the final destination, therefore passing the message to C is a sensible move.

The routing table based delivery assumes that the routing table is accurately represent the relationship between a node and all other nodes. The routing table has to be built by some way. In our system we build the routing table using a connectivity matrix. The connectivity matrix is a 127×127 grid (126 nodes plus the central node, hence the 127), where the rows and columns represent node IDs. In each cross-point we mark if the node of the given row can directly talk to the node of the given column. Thus, that matrix represents all possible node to node transfers in the network and is shown in FIG. 8.

From the matrix it is reasonably easy to work out the shortest route(s) between any two nodes. A node, by working out the shortest route between itself and any target node can store the first leg of the route in the routing table entry for the target node's entry. If it can be assured that the connectivity matrix is identical in all nodes, then they will all work out the same shortest routes and thus local decisions become part of a global optimal routing decision. If the connectivity matrices are different in different nodes, the decisions will not be coherent and the network will operate sub-optimally or not at all. The maintenance of the connectivity matrix is therefore crucial in this implementation.

When a new node joins the network it takes time to discover its possible connections and obtain the connectivity matrix from neighbour nodes. Furthermore, it takes time for the changes of the connectivity matrix, due to the presence of the new node, to propagate through the network. To provide a means to communicate with the new node in the meantime the concept of the temporary route is introduced.

The new node knows nothing about the network topology but it knows that it can talk to at least one node: the one that it used as a helper during its address acquisition. It can also assume that that node knows how to reach other nodes to the network.

In addition, the helper node must be able to talk to the central node, otherwise the address acquisition would not happen. Therefore, although its connectivity matrix is currently empty, it sets up two routes in its routing table, one to the central node and one to the helper node, both pointing to the helper node.

Then it attempts to build a reliable data link to the central node. It starts with the new node sending a message to the central one. This message will be sent to the helper node. Since message forwarding looks only at the final destination, the central node in this case, the message will be delivered to the central node. But how does the response get back to the new node?

Each node when, it forwards a message, looks at the origin field in the routing header. If the original sender is not in the routing table, then node will set up a temporary route to the origin and the route will point to the node from which the message was received.

For example, in the ABCD example A is the central node and currently the network consists only from A, B and C. The routing tables in the four nodes shown in table 6:

TABLE 6

| A | | B | | C | | D | |
|---|---|---|---|---|---|---|---|
| Dest | Forw | Dest | Forw | Dest | Forw | Dest | Forw |
| A | — | A | A | A | B | A | — |
| B | B | B | — | B | B | B | — |
| C | B | C | C | C | — | C | — |
| D | — | D | — | D | — | D | — |

Now D, a new node, joins the network through C. As mentioned, it sets up temporary routes (indicated by lowercase letter) to the helper node (C) and to the central node (A) using the helper node as forwarder, as shown in table 7:

TABLE 7

| A | | B | | C | | D | |
|---|---|---|---|---|---|---|---|
| Dest | Forw | Dest | Forw | Dest | Forw | Dest | Forw |
| A | — | A | A | A | B | A | c |
| B | B | B | — | B | B | B | — |

TABLE 7-continued

| A | | B | | C | | D | |
|---|---|---|---|---|---|---|---|
| Dest | Forw | Dest | Forw | Dest | Forw | Dest | Forw |
| C | B | C | C | C | — | C | c |
| D | — | D | — | D | — | D | — |

It then sends a message to A using C. The message will have the sender as D. As the message travels the C-B-A path, all nodes will set up a temporary routing table entry to the source D pointing to the node where the message has just arrived as shown in table 8:

TABLE 8

| A | | B | | C | | D | |
|---|---|---|---|---|---|---|---|
| Dest | Forw | Dest | Forw | Dest | Forw | Dest | Forw |
| A | — | A | A | A | B | A | c |
| B | B | B | — | B | B | B | — |
| C | B | C | C | C | — | C | c |
| D | b | D | c | D | d | D | — |

Thus, the message traversing from D to A sets up a return path that can be used while the network topology changes spread through the network. The temporary routes get replaced by real routes as the network learns about the changes. Furthermore, temporary routes get dismantled if they are not used for a while in order to minimise the possibility of creating false routes to non-existent nodes. For example, if D drops out of the network soon after it joined, then after a while A, B and C will delete the temporary routes to D as there is no communication to and from D.

Although the connectivity matrix does not have to be a symmetrical matrix (that is, just because A can hear B it does not necessarily mean that B can also hear A). For practical purposes (a symmetrical matrix can be stored in half the space) the system demands that connections are bidirectional, that is, a connection is only considered if both parties can talk to the other. Therefore, before adding a connection to the matrix the parties have to establish that fact.

If a node overhears an other node's message (for example during the MAC layer's "cone-of-silence" providing short message exchanges) and it received the message with at least at a certain strength (so chances are that the other node would receive this node's messages just fine), it marks that other node as potential connection target. It will try to send it a message requesting for a connection with that node. When the other node receives that message it will, if the message arrived with a reasonable signal strength, respond that a connection can indeed be built. After a further confirmation message exchange both nodes will add the new connection between them to their connectivity matrices.

A node constantly monitors its own connections. If it can not hear the other node for a certain time, then it will delete the connection, on the assumption that the other node dropped out of the network. Since nodes can not be silent for very long periods, this method is justified.

The whole routing is based on the assumption that the connectivity matrix is the same in each and every node in the network. Since all nodes operate on the same information about network topology, they can make only local decisions and still achieve global routing efficiency because they can assume that all other nodes will do the same.

Therefore the nodes need to keep the connectivity matrices in sync. A node is authoritative to its own row in the matrix because it know very well which nodes it can directly talk to and which ones it can not. So each node regularly sends a broadcast message containing its own matrix row. If an other node receives that message it will load that row into its own copy of the matrix. While this assures that nodes that can actually hear the sending node will have up to date information about the sender, nodes outside of its radio distance will not receive that information. Therefore, nodes disseminate not only their own matrix rows but rows of other nodes as well. If a node sends out its own matrix row, nodes within its radio range will receive that row. Then these nodes will, in turn, broadcast that row so that nodes within two hops of the original sender will receive it. When those nodes transmit the matrix row, then the nodes three hops away will learn it and so on.

When a node sends its own matrix row, the authenticity of the row can easily be established since the sender is the same node as the node that the row describes. However, when a node sends a matrix row of an other node, the receivers can not be sure how reliable that information is.

Therefore, matrix row messages have a age field that tells the receiver how long ago the original message from the actual node that the matrix row describes has been received. Nodes replace a row in the matrix only if the message they received is younger than the age of the row in their own matrix and they also keep track of the ages of the rows in their matrix. For example, if a node receives an authoritative matrix row (by definition, it has an age of 0) it will put it into its matrix and mark it for dissemination.

If the node for some reason can not send the row out for say 5 seconds, then when it does it will mark the row as 5 seconds old. Then the hop two nodes receive the message and if their matrix rows are older than 5 seconds, they will put the new information in the matrix, but note that that row is 5 seconds old. Chances are that they can not send the row out for a time. If a hop two node needs to wait 4 second before transmitting the matrix row, it will mark the age of the row as 9 seconds when it finally sends it out.

The mechanism described above ensures that if a node is spewing out stale matrix row information, it will not be used by nodes that can get newer, more reliable information from other sources and that in time the stale information will be replaced with a more up to date one.

If a node sends a matrix row, then the nodes receiving that row will, in turn, send the row again. Then the hop two nodes will do the same, then the hop fours and so on. Thus, for each matrix row message there would be a wave of broadcast transmissions throughout the network. Ultimately, each node will send a message, so a single matrix row update can cause, in theory, 127 broadcast messages to be transmitted. Since all nodes publish their own rows, a full update cycle of the network would need 127*127 or about 16 thousand messages. Since the matrix update can use only a part of the available bandwidth, the matrix dissemination would be extremely slow.

However, the network is not changing constantly. Most of the time the matrix rows received will be the same as the ones already in the matrix. Therefore, sending these unchanged rows is a waste of bandwidth. To avoid the waste the nodes do not actually send the matrix rows themselves, but a number, called a hash value calculated from the content of the row. A hash value has the property that although many different matrix rows can generate identical hash values, rows that are similar to each other will generate different hashes. That is, if there was a slight change in a row (for example a single connection has been added or removed) the hash value will be different. Rows not even resembling one an other can have the same has value but when a row changes by nodes appearing or disappearing from the network, their neighbours rows' hash value will be changing as well.

Therefore, nodes do not disseminate the actual matrix rows. Rather, they broadcast the hash values instead. The hash value is much smaller than a matrix row and thus a lot of hash values can be fit into broadcast packet that would otherwise contain a single matrix row.

When a node receives a hash value that is younger (that is, more fresh) than the current age of the relevant row in the node's matrix, it will compare the received hash value to the hash value of the row it has. If they are identical, it decides that it has up to date information and sets the row's age to the age received with the has value. If the hash value does not match, then it knows that it has outdate information and sends a request for the actual matrix row. Since most of the time matrix rows do not change, all that needs to be transmitted is the hash values, not the rows themselves.

Further optimisation is also possible. Hash values allow nodes to assure that their matrix rows are the same as other nodes' in the system. Therefore, hash values are broadcasted at a very low rate. The trickle of hashes is barely enough to assure that nodes can be confident that they have correct information. However, if a matrix row changes, the dissemination of that row is prioritised. Therefore, real changes will ripple through the network fairly rapidly, while the background maintenance consume a reasonably small part of the available bandwidth.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

What is claimed is:

1. An emergency system for providing an emergency function, comprising:
   a controller;
   a plurality of emergency devices, each for providing the emergency function; and
   transmitters and receivers for producing a mesh network for providing wireless communication of data between the controller and the emergency devices so that the operability of the plurality of emergency devices in an emergency situation can be tested by a wireless signal over the mesh network to the emergency devices to initiate a test operation of the devices and for communicating data relating to the test back to a control receiver, each device having a processor for establishing a preferred wireless communication link of the mesh network to another emergency device for relaying the signal and for relaying the data to the control receiver, and for establishing an alternative wireless communication link via a further emergency device, if the preferred wireless communication link is inoperative, the controller balancing the mesh network by forcing at least one of the plurality of emergency devices to detach.

2. The system of claim 1 wherein the controller also comprises the control receiver.

3. The system of claim 1 wherein
   the processor has a routing table which lists all emergency devices in a subnet of emergency devices, the subnet comprising the said another emergency device providing the preferred control link and a plurality of further emergency devices through which the alternative wireless communication link can be established.

4. The system of claim 3 wherein the processor is also for updating the another emergency device in the event of failure of the initial preferred communication link.

5. The system of claim 1 wherein the emergency system comprises an emergency lighting system for providing emergency lighting in the event of an emergency situation where power to an environment is shut off and the emergency devices comprise emergency lighting devices for providing an exit path from the environment.

6. The system of claim 1 wherein the transmitters and receivers for producing the mesh network comprise a transceiver in each of the emergency devices for receipt and transmission of over-the-air signals, and a transceiver in the at least one controller.

7. The system of claim 1 wherein the controller comprises an area controller and at least one router, the area controller being connected to the at least one router by a network.

8. The system of claim 7 wherein the network is the internet, a LAN, a WAN, or a PSTN, or any other media which can carry IP packets.

9. The system of claim 1 wherein the system includes an additional plurality of emergency devices connected to the controller by a communication link formed by a cable, thereby enabling conventional wired emergency devices to also be included in the system.

10. The system of claim 1 wherein the controller initiates the mesh network using a quietest channel available to the controller.

11. The system of claim 1 wherein at least one of the plurality of emergency devices joins a subnet of the mesh network associated with a strongest signal.

12. The system of claim 1 wherein at least one of the plurality of emergency devices joins a subnet of the mesh network associated with a weighted sum of factors comprising at least one of signal strength, channel noise, hopcount, and subnet population.

13. The system of claim 1 wherein at least one of the plurality of emergency devices transmits a short message comprising an advertisement, the advertisement representing an intended transmission to an intended recipient of the intended transmission.

14. The system of claim 13 wherein at least one of the plurality of emergency devices within radio distance of the at least one emergency device transmitting the short message remains silent during transmission of the intended transmission.

15. The system of claim 13 wherein at least one of the plurality of emergency devices within radio distance of the intended recipient of the short message remains muted during transmission of a response transmission from the intended recipient to the at least one emergency device transmitting the short message.

16. The system of claim 1 wherein at least one of the plurality of emergency devices requests a node address prior to joining the mesh network, the node address being allocated by the controller.

17. The system of claim 1 wherein at least one of the plurality of emergency devices is assigned a temporary address upon connection to the mesh network, the temporary address comprising a node address of a helping node connected to the mesh network plus a predetermined number.

18. An emergency system for providing an emergency function, comprising:
   a controller;
   a plurality of emergency devices, each for providing the emergency function; and
   transmitters and receivers for producing a mesh network for providing wireless communication of data between the controller and the emergency devices so that the operability of the plurality of emergency devices in an emergency situation can be tested by a wireless signal over the mesh network to the emergency devices to initiate a test operation of the devices and for communicating data relating to the test back to a control receiver, each device having a processor for establishing a preferred wireless communication link of the mesh network to another emergency device for relaying the signal and for relaying the data to the control receiver, and for establishing an alternative wireless communication link via a further emergency device, if the preferred wireless communication link is inoperative, the controller balancing the mesh network by forcing at least one of the plurality of emergency devices to detach, wherein at least one of the plurality of emergency devices is assigned a system identifier, the system identifier distinguishing between independent installations of the mesh network.

19. The system of claim 18 wherein the controller also comprises the control receiver.

20. The system of claim 18 wherein the processor has a routing table which lists all emergency devices in a subnet of emergency devices, the subnet comprising the said another emergency device providing the preferred control link and a plurality of further emergency devices through which the alternative wireless communication link can be established.

21. The system of claim 20 wherein the processor is also for updating the another emergency device in the event of failure of the initial preferred communication link.

22. The system of claim 18 wherein the emergency system comprises an emergency lighting system for providing emergency lighting in the event of an emergency situation where power to an environment is shut off and the emergency devices comprise emergency lighting devices for providing an exit path from the environment.

23. The system of claim 18 wherein the transmitters and receivers for producing the mesh network comprise a transceiver in each of the emergency devices for receipt and transmission of over-the-air signals, and a transceiver in the at least one controller.

24. The system of claim 18 wherein the controller comprises an area controller and at least one router, the area controller being connected to the at least one router by a network.

25. The system of claim 24 wherein the network is the internet, a LAN, a WAN, or a PSTN, or any other media which can carry IP packets.

26. The system of claim 18 wherein the system includes an additional plurality of emergency devices connected to the controller by a communication link formed by a cable, thereby enabling conventional wired emergency devices to also be included in the system.

27. The system of claim 18 wherein the controller initiates the mesh network using a quietest channel available to the controller.

28. The system of claim 18 wherein at least one of the plurality of emergency devices joins a subnet of the mesh network associated with a strongest signal.

29. The system of claim 18 wherein at least one of the plurality of emergency devices joins a subnet of the mesh network associated with a weighted sum of factors comprising at least one of signal strength, channel noise, hopcount, and subnet population.

30. The system of claim 18 wherein at least one of the plurality of emergency devices transmits a short message comprising an advertisement, the advertisement representing an intended transmission to an intended recipient of the intended transmission.

31. The system of claim 30 wherein at least one of the plurality of emergency devices within radio distance of the at least one emergency device transmitting the short message remains silent during transmission of the intended transmission.

32. The system of claim 30 wherein at least one of the plurality of emergency devices within radio distance of the intended recipient of the short message remains muted during transmission of a response transmission from the intended recipient to the at least one emergency device transmitting the short message.

33. The system of claim 18 wherein at least one of the plurality of emergency devices requests a node address prior to joining the mesh network, the node address being allocated by the controller.

34. The system of claim 18 wherein at least one of the plurality of emergency devices is assigned a temporary address upon connection to the mesh network, the temporary address comprising a node address of a helping node connected to the mesh network plus a predetermined number.

* * * * *